UNITED STATES PATENT OFFICE.

WILBER A. HOBBS, OF PITTSBURGH, PENNSYLVANIA, ASSIGNOR TO CHARLES ADAMS, TRUSTEE, OF NEW ROCHELLE, NEW YORK.

MANUFACTURE OF BREAD.

1,131,698.  Specification of Letters Patent.  Patented Mar. 16, 1915.

No Drawing.  Application filed April 30, 1914.  Serial No. 835,421.

*To all whom it may concern:*

Be it known that I, WILBER A. HOBBS, a citizen of the United States, residing at Pittsburgh, Allegheny county, State of Pennsylvania, have invented certain new and useful Improvements in Manufacture of Bread; and I do hereby declare the following to be a full, clear, and exact description of the invention, such as will enable others skilled in the art to which it appertains to make and use the same.

My invention relates to the treatment of wheat flour, for the purpose of obtaining therefrom baked bread and the like of superior whiteness.

In the practice of the invention, I add calcium hypochlorite ($CaOCl_2$) in the form of powder, to the flour, (say hard wheat flour), mixing it uniformly and homogeneously therewith in the proportion of one pound of the hypochlorite to 2500 pounds of flour. I then permit the mixture to stand for say 24 hours, at ordinary atmospheric temperatures, previous to making the dough for the bread batch.

The use of the calcium hypochlorite alone is somewhat prejudicial to the development of the fermentation, which is delayed thereby. I have discovered that this prejudicial delay in the subsequent fermentation of the dough may be eliminated by adding to the dough made from the flour treated a sufficient amount of a neutralizing agent to neutralize the alkalinity of the hypochlorite. To this end, I may employ any suitable acid, such as tartaric acid, lactic acid, or other organic acid, or sufficiently dilute sulfuric or hydrochloric acid, as the case may be, or a neutralizing salt, as, for instance, ammonium tartrate.

It will, of course, be evident, that the small quantity of calcium hypochlorite employed can have no material bleaching effect upon the flour. My discovery resides in the fact that the whitening effect is developed during the fermentation of the dough batch, wherein it makes itself fully and efficiently manifest in spite of its small proportion.

What I claim is:—

1. In the manufacture of bread, the method of obtaining loaves of superior whiteness from the flour employed, which comprises mixing a small quantity of calcium hypochlorite, as described, with the flour from which the bread dough is made, permitting the mixture to stand, preparing a dough batch from the mixture and fermenting the dough batch; substantially as described.

2. In the manufacture of bread, the method of obtaining loaves of superior whiteness from the flour employed, which comprises mixing a small quantity of calcium hypochlorite, as described, with the flour from which the bread dough is made, permitting the mixture to stand, preparing a dough batch from the mixture, adding as one of the ingredients of the dough a sufficient amount of a neutralizing agent to neutralize the alkalinity of the calcium hypochlorite, and fermenting the dough; substantially as described.

In testimony whereof I affix my signature, in presence of two witnesses.

WILBER A. HOBBS.

Witnesses:
J. J. O'CONNOR, Jr.,
E. W. TILLETSON.